United States Patent [19]

Kunze et al.

[11] Patent Number: 4,824,203

[45] Date of Patent: Apr. 25, 1989

[54] CONNECTOR DEVICE COMPRISING A RECEPTACLE PART SURROUNDING THE LIGHT WAVEGUIDE

[75] Inventors: Dieter Kunze, Neuried; Norbert Odemar; Josef Schramm, both of Munich, all of Fed. Rep. of Germany

[73] Assignee: Siemens Aktiengesellschaft, Berlin and Munich, Fed. Rep. of Germany

[21] Appl. No.: 143,752

[22] Filed: Jan. 14, 1988

[30] Foreign Application Priority Data

Jan. 15, 1987 [DE] Fed. Rep. of Germany ....... 3701038

[51] Int. Cl.⁴ ............................ G02B 6/36; G02B 6/38
[52] U.S. Cl. ................................. 350/96.21; 350/96.20
[58] Field of Search ................ 350/96.20, 96.21, 96.22

[56] References Cited

U.S. PATENT DOCUMENTS 4,370,022 1/1983 Johnson ........................... 350/96.21

FOREIGN PATENT DOCUMENTS 0125525 11/1984 European Pat. Off. .
0045594 5/1985 European Pat. Off. .
2701436 7/1977 Fed. Rep. of Germany .
2616873 11/1977 Fed. Rep. of Germany .
1580061 11/1980 United Kingdom .

*Primary Examiner*—William L. Sikes
*Assistant Examiner*—Akm E. Ullah
*Attorney, Agent, or Firm*—Hill, Van Santen, Steadman & Simpson

[57] ABSTRACT

A connector part having a cylindrical receptacle part having at least one press-on region of an enlarged, outside diameter and a sleeve which is slipped on to the press-on region to form a press fit and cause a radial clamping of the receptacle part on an optical fiber inserted therein. The slipped-on sleeve covers the entire region in which the two optical fibers to be connected have been centered. Preferably, the bore receiving the two stripped optical fibers has enlarged portions for receiving jacketed portions of the light waveguides, which are in the pressed-on region so that the sleeve will clamp the to fibers in a connection and also clamp the adjacent cladded portions of the waveguides so that the connection can be subjected to tensile stresses.

12 Claims, 3 Drawing Sheets

CONNECTOR DEVICE COMPRISING A RECEPTACLE PART SURROUNDING THE LIGHT WAVEGUIDE

BACKGROUND OF THE INVENTION

The present invention is directed to a connector device having a receptacle part or member which has an axially extending bore having a diameter for receiving optical fibers and enlarged portions for receiving cladded fibers with a concentric outer surface and a sleeve movable onto the outer surface to cause the receptacle part to be urged radially inward onto the optical fiber to hold them in a connected manner.

U.S. Pat. No. 4,370,022 discloses a connector device having clamping and centering of two optical fibers to be coupled utilizing a connector part which receives the optical fiber positioned between rods and has two outer sleeve members urged onto the part to urge the rods into gripping engagement with the optical fibers. As a result of the slip-on of the sleeves, the radial pressing of the device causes the optical fibers to be axially aligned and gripped between the round rods. However, the joint region in the assembled condition is not completely covered by the sleeves, and this potentially provides a disadvantage when coupling optical fibers having different cross sections or, respectively, unround or non-cylindrical cross sections. Moreover, the connector means fashioned in this way can hardly be stressed under tension, since the cladded or jacketed region of each of the light waveguides is not adequately gripped or clamped by the connector.

SUMMARY OF THE INVENTION

The object of the present invention is to create a connecting means in which two optical fibers of different thicknesses can be simply and precisely connected to one another and which connecting means can be subjected to tension forces.

The object of the present invention is obtained by a connecting device which is designed to connect two light waveguides in an abutting relationship, the connector device comprises a receptacle part, which has an axially extending bore with a portion of a diameter for receiving the stripped optical waveguides or fibers, and concentric larger bores for receiving the jacketed optical fibers. In the region of the small bore, the receptacle part has a cylindrical outer diameter of a large diameter and, adjacent to this region, has a cylindrical portion of a smaller diameter, and at least one sleeve member moved from a region of the smaller outer diameter to the region of the larger diameter surrounding the small bore containing the stripped fibers for urging the receptacle part radially inward into gripping engagement with the stripped fibers and adjacent portion of the jacketed fibers.

Since the force, which is acting radially inward, occurs in the immediate joint region of the stripped optical fibers to be connected due to the slipped-on sleeve, unround optical fibers or fibers having different diameters can also be reliably coupled together. As a result of the uninterrupted sleeve being pressed on, the light waveguide, together with their jackets, are clamped to the receptacle parts so that tensile stresses frequently occurring during utilization are not transmitted onto the joint between the fibers. The joint of the two optical fibers is, thus, preserved to a greater possible degree, and the coupling attenuations are reduced to a minimum.

In additional developments or embodiments of the invention, the first optical fiber is fixed independently of the second by employing two or three sleeves. Since the first optical fiber is, thereby, additionally protected against axial dislocation, the coupling of the second optical fiber can occur in an especially simple manner in a practical assembly.

Other advantages and features of the present invention will be readily apparent from the following description of the preferred embodiments, the drawings and claims.

DESCRIPTION OF THE PREFERRED EMBODIMENTS

Figure 1:
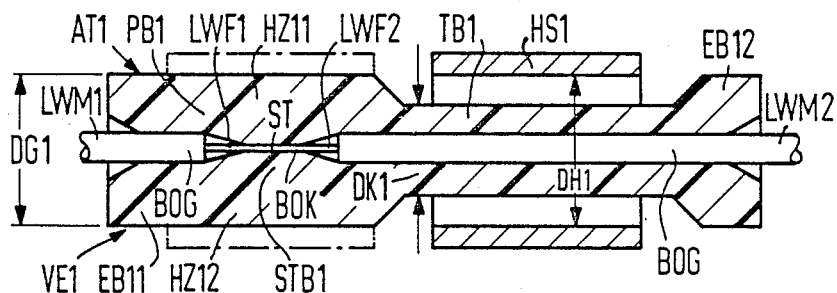
FIG. 1 is a longitudinal, cross sectional view of a first connecting device in accordance with the present invention.
Figure 2:
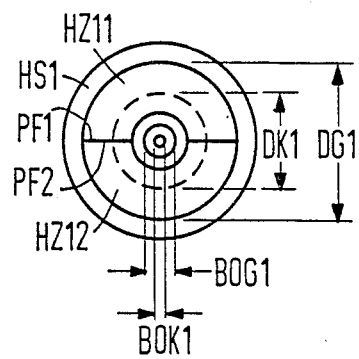
FIG. 2 is an end view of the device of FIG. 1, taken from the left-hand side.

FIGS. 1 and 2 show a connector device VE1, which is composed of two half-cylinders HZ11 and HZ12, as well as a metal sleeve HS1. The two half-cylinders HZ11 and HZ12 have their flat or planar fitting surfaces PF1 and PF2 placed against one another to form the receptacle member AT1, which has coaxial bores BOG and BOK, with the bore BOG having the larger diameter BOG1 and the bore BOK having a smaller diameter BOK1. A press-on region PB1 and an end region EB11, following immediately thereupon, as well as the other end region EB12, have an outside diameter of DG1, as illustrated in FIG. 1. Between the press-on or press region PB1 and the end region EB12, the receptacle part AT1 has a sub-region TB1 having a reduced diameter DK1, in which the sleeve HS1 is situated with adequate play in an unassembled condition. The transition between the outside diameter DG1 and DK1 is, preferably, done by a conically extending shoulder. The bore BOG has the larger inside diameter BOG1, which extends into the edge regions of the press region PB1 and are situated in the end regions EB11 and EB12, as well as in the sub-region TB1. These larger bores BOG then conically merge into a small bore BOK having the smaller inside diameter BOK1, which corresponds to the diameter of a stripped light waveguide, such as LWF1 or LWF2. A joint ST of the bare or stripped optical fibers LWF1 and LWF2 is in the region of the small bore BOK and is situated, roughly, in the middle of the press-on region PB1. The outside diameter DG1 of the press-on region PB1 is somewhat greater than the inside diameter DH1 of the sleeve HA1 so that when the sleeve HA1 is slipped onto the press-on region PB1, it will cause a press fit to radially urge the material of the receptacle onto waveguides in the bore BOK and also onto the jackets in the bores BOG adjacent the bore BOK.

During assembly, one proceeds so that the light waveguides LWM1 and LWM2, which are to be coupled together, are introduced so that they are inserted into the bores BOG of the end regions EB11 and EB12 and that the stripped optical fibers LWF1 and LWF2 strike one another in the joint region STB1. It must, therefore, be observed that the joint ST comes to lie in the middle of the joint region STB1 and that the jackets light waveguides LWM1 and LWM2 end before the two transitions from the larger bores BOG to the smaller bore BOK. In order to clamp the inserted optical fibers LWF1 and LWF2 inside the receptacle part AT1, the sleeve HS1 is slipped onto the press region PB1. The two half-cylinders HZ11 and HZ12, which are composed of an elastic material, are, thus, uniformly, radially compressed and are pressed against the optical fibers LWF1 and LWF2. The press region PB1 essentially corresponds to the length of the sleeve HS1 and is expediently selected so that both the stripped optical fibers LWF1 and LWF2, as well as the adjacent end parts of the jacketed light waveguides LWM1 and LWM2 are contained therein. The position of the slipped-on sleeve HS1 is illustrated in broken lines in the assembled position in FIG. 1. Since the end regions of the cladded light waveguides LWM1 and LWM2 are also pressed with their receptacle part AT1, an effective joint region STB1 is guaranteed, and will withstand tension being placed on the two waveguides LWM1 and LWM2.

Figure 3:
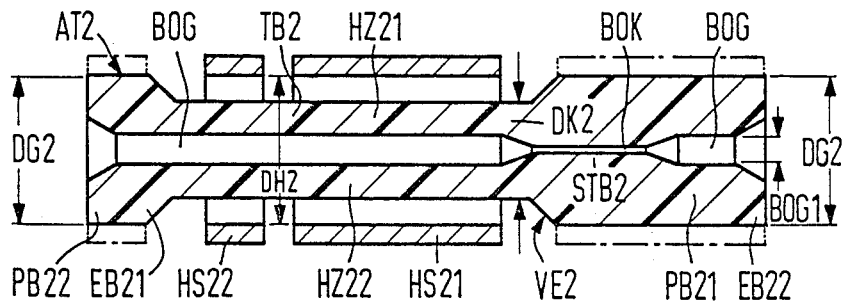
FIG. 3 is a longitudinal, cross sectional view of a first embodiment of the connecting device of the present invention.

A first embodiment of the connector means is generally indicated at VE2 in FIG. 3. The connector means or device VE2 includes two sleeves HS21 and HS22, as well as a receptacle part AT2, which is formed of two planarly adjacent half-cylinders HZ21 and HZ22 which, when held together, form bores BOG and BOK. A joint region STB2 and the end region EB22 immediately adjacent thereto, together, form a broader pressing or press-on region PB21, whereas an end region EP21 is provided as a second, more narrowly constructed pressing or press-on region PB22. The sub-region TB2, whose diameter is fashioned correspondingly smaller than the regions PB21 and PB22 in order to be able to accept the two sleeves HS21 and HS22 with adequate play in the unassembled condition, is situated between the two pressing regions PB21 and PB22, which have the larger outside diameter DG2. The bore BOG comprising the larger diameter BOG1, thus, proceeds in the end region EB21 and connecting sub-region TB2, and tapers at its end in the pressing region PB2 to form a smaller bore BOK. The joint region STB2 proceeds along the smaller bore BOK and ends roughly in the middle of the pressing region PB21, where a transition to the larger bore BOG occurs and extends to the end region EB22. By contrast, in the embodiment of FIG. 1, one optical fiber can be clamped independently of the second in this arrangement, wherewith, particularly given optical fibers differing in thickness, a better centering is achieved.

During assembly, the first optical fiber (not shown in FIG. 3) is introduced from the left into the bore BOG, beginning at the end region EB21, and is introduced until the end of the jacket of the optical fiber is adjacent the transition between the large diameter to the small diameter bore BOK. The stripped optical fiber should, then, extend into the middle of the joint region STB2, similar to the illustration in FIG. 1. Since the inside diameter DH2 of the sleeves HS21 and HS22 are somewhat smaller than the outside diameters DG2 of the press-on portions PB21 and PB22, a radial clamping of the first optical fiber in the receptacle part AT2 is initially guaranteed with the slipping-on of the sleeve HS22 onto the part EB21. From the right, the second optical fiber is introduced in the bore BOG of the end region EB22 until the stripped end of the fiber strikes the first optical fiber, which is already fixed. Then, the sleeve HS21 is slipped onto the pressing region PB21 so that both optical fibers are centered in their stripped portions. Simultaneously, the second right-hand optical fiber has its jacketed region clamped in a radially clamped fashion in the bore BOG. The sleeve HS21 and HS22 are slipped on with pressed fits, as shown in broken lines, to form the completed assembly connector means or device VE2. The sleeve HS21 and HS22 terminate flush with the end faces of the respective end regions EB22 or, respectively, EB21. Analogous to FIG. 1, all diameter transitions are preferably fashioned with a conical portion.

Figure 4:
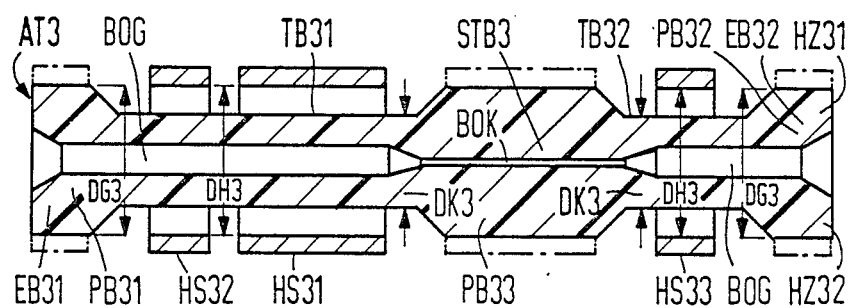
FIG. 4 is a longitudinal, cross sectional view of a third embodiment of the connecting device of the present invention.

A second or further embodiment of the connector device is generally indicated at VE3 in FIG. 4. The connector device VE3 is composed of three sleeves HS31, HS32 and HS33. The joint region STB3, as well as the two regions EB31 and EB32 of the receptacle part AT3, which is formed of two half-cylinders HZ31 and HZ32, have their larger outside diameters DG3 forming the respective pressing or press-on regions PB33 in the center with end pressing or press-on regions PB31 and PB32. These pressing regions receive the sleeve with the pressing region PB33 receiving the sleeve HS31, region PB31 receiving the sleeve HS32 and region PB32 receiving the sleeve HS33. The inside diameter DH3 of each of the sleeves HS31, HS32 and HS33 is somewhat smaller than the outside diameter DG3 of the receptacle part AT3. The sub-regions TB31 and TB32 lie between the joint region STB3 and the end regions EB31 and EB32, respectively, and have a smaller outside diameter DK3 that is fashioned so that, in the unassembled condition, the longer, sub-region TB33 can carry the sleeves HS31 and HS32 with adequate play and that the shorter sub-region TB32 can carry the sleeve HS33 with adequate play. The bores BOG for receiving the jacketed optical fibers proceed concentrically through the receptacle part AT3 beginning at the end faces of the end regions EB31 and EB32 and taper at the ends or edges of the pressing region PB33 to form the smaller bore BOK, which can accept the stripped optical fibers.

During assembly, the first optical fiber is introduced into the bore BOG extending through the end region EB31 with the stripped optical fiber ending roughly in the middle of the pressing region PB33 and the jacket ending no later than at the diameter transition of the bores BOG to the bore BOK. The left-hand jacketed optical fiber is then clamped to the receptacle part AT3 in the end region EB31 and is tensilly held in this position due to the slipping on of the sleeve HS32 onto the pressing region PB31. A second optical fiber is then introduced from the right side until its end strikes the first and, in an analogous way, is clamped together with its jacket by the sleeve HS33 being pressed onto the end region EB32. The actual centering, finally, is achieved by the slipping of the sleeve HS31 onto the pressing region PB33 to create a radial force in a joint region STB3 to align the stripped optical fibers with an exact alignment. FIG. 4 shows the position of the slipped-on sleeves HS31, HS32 and HS33 in broken lines for the complete assembly of the connector means VE3.

Figure 5:
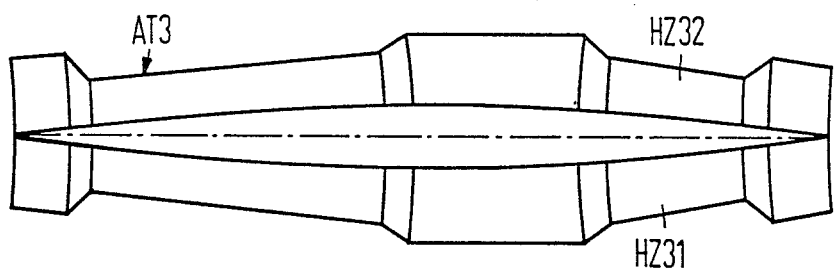
FIG. 5 is a side view of a portion of the connecting device of FIG. 4, without sleeves.

In order to be able to unproblematically insert the optical fibers into the unclamped connector means, such as VE1, VE2 of VE3, it is expedient that a play adaptation between the bores BOG or, respectively, BOK, and the optical fibers is established. The two half-cylinders, for example HZ31 and HZ32 can, therefore, be held at a distance from one another in the middle region, as shown in FIG. 5 in an exaggerated illustration. This can be achieved, for example, by a longitudinal, transverse pre-stress of the two half-cylinders, for example, HZ31 and HZ32, or by resilient adaptor part, which presses the two halfed cylinders, for example, HZ31 and 32 apart in the unclamped condition.

The funnel-like expansions of the ends of the bores BOG at the end regions, for example, EB31 and EB32, serves the purpose of facilitating the introduction of the optical fibers. An immersion fluid can be introduced into the bore BOK of the receptacle part, for example, AT3 for a further improvement of the coupling quality. Care should, therefore, be exercised to see that any excess immersion fluid can escape upon introduction of the optical fibers, and this is guaranteed by a transverse groove or opening being provided in the joint region, for example the region STB3.

The half-cylinders HZ11–HZ32, used in the exemplary embodiments of the invention, can be composed of metal, glass, ceramic or plastic. They are, preferably, composed of a thermoplastic which is filled with glass fibers, mineral fibers or carbon fibers in order to reduce the coefficient of thermal expansion. Materials of this type can be manufactured in a very cost-effective way by an injection molding process or pressing process, and have certain elasticity so that two optical fibers having different diameters can also be precisely centered.

The spring properties of the connector means, for example, VE3, can be improved by a ridge-shaped projection on the surfaces of the half-cylinders HZ31 and HZ32, or by the sleeves HS31–HS33 having axial slots or grooves. In order to guarantee a reliable seizing of the sleeve, for example, HS31–HS33 on the pressing region PB31, PB32, and in order to suppress an axial dislocation, nose-shaped projections can be provided on an outside of the pressing region PB31–PB33, and corresponding depressions can be provided in the edge regions of the sleeves, for example, HS31–HS33.

Figure 6:
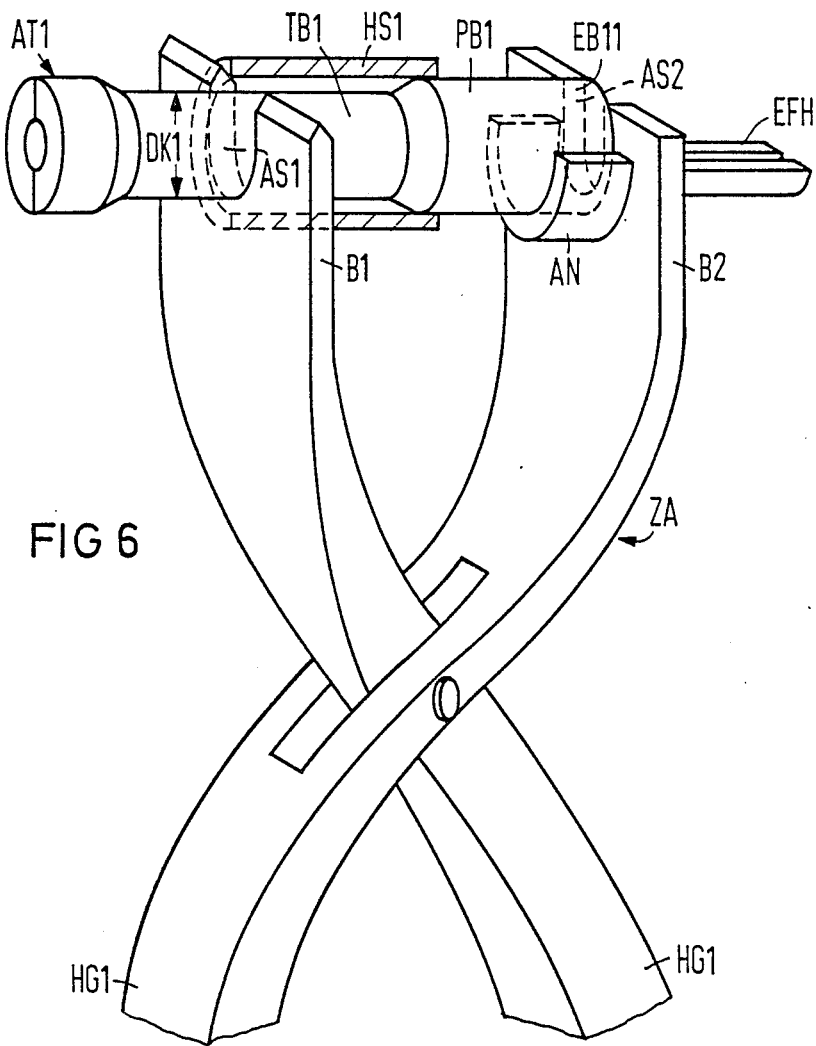
FIG. 6 is a perspective view of a tool for moving a sleeve of the device onto an enlarged press-on portion of the device to form a connection.

To aid in assembly of the connector device, such as VE1–VE3, a manual pliers or tool ZA (see FIG. 6) is provided. To this end, one jaw B1 having a large recess or opening AS1 embraces the end face region of the sleeve HS1 to press it onto the press region PB1. The other jaw B2 has a smaller, oblong recess AS2 so that it can embrace the end region EB1 without contacting the optical fiber. A stop or support member AN for the acceptance of the receptacle part AT1 and an introduction aid EFH for the optical fiber are expediately attached to the pair B2. By pressing the handles HG1 and HG2 together, the sleeve HS1 is shifted from a sub-region TB1 having the smaller outside diameter DK1 onto the pressing region, for example, PB1. An expedient, simple and fast assembly of the connector means is, thus, achieved.

Although various minor modifications may be suggested by those versed in the art, it should be understood that we wish to embody within the scope of the patent granted hereon all such modifications as reasonably and properly come within the scope of our contribution to the art.

We claim:

1. A connector device comprising at least one sleeve and a receptacle part surrounding the light waveguides, which are each provided with an unstripped jacket portion and an end with a stripped optical fiber portion, the receptacle part comprising at least one cylindrical region having a small outside diameter and at least one further cylindrical region having a large outside diameter, said one cylindrical region with the large outside diameter forming a press-on region, said part having an axially extending bore with a small diameter portion for receiving the stripped optical fiber portions and subsequent bores with large diameter portions for receiving the unstripped jacket portions of the waveguides, all of said bores lying in the press-on region to form a joint region, said sleeve having an inside diameter that is slightly less than the outside diameter of the press-on region, the length of the small diameter bore portion being less than the length of the press-on region so that both stripped optical fiber portions, as well as unstripped jacket portions of the light waveguides, are received in the joint region and are subjected to radical clamping forces when the sleeve is assembled onto the press-on region.

2. A connector part according to claim 1, wherein the bore has transition regions between the large and small diameters which have a step-like, conical portion.

3. A connector part according to claim 1, wherein the receptacle part is formed by two half-cylindrical members having planar surfaces, said cylindrical members, in an unassembled condition, having a spacing between the planar surfaces in the joint region.

4. A connector part according to claim 1, wherein in the joint region, the receptacle part has a transverse opening for the acceptance of excess immersion fluids.

5. A connector part according to claim 1, wherein the receptacle part has conical connecting regions extending between the large diameter portions and the small diameter portions.

6. A connector part according to claim 1, wherein the enlarged diameter portions have ribbing and the sleeves have an inside slot corresponding to said ribbings.

7. A connector part according to claim 1, wherein the bore at each end of the receptacle part has a conical entrance portion to facilitate insertion of the optical fiber.

8. A connector device comprising at least one sleeve and a receptacle part surrounding the light waveguides, which are each provided with an unstripped jacket portion and an end with a stripped optical fiber portion, the receptacle part comprising at least one cylindrical region having a small outside diameter and at least one further cylindrical region having a large outside diameter, said one cylindrical region with the large outside diameter forming a press-on region, said part having an axially extending bore with a small diameter portion for receiving the stripped optical fiber portions and subsequent bores with large diameter portions for receiving the unstripped portions of the waveguides, said bore with the small diameter portion and one of the bores with the larger diameter portion lying in the press-on region to form a joint region, said sleeve having an inside diameter that is slightly less than the outside diameter of the press-on region, the length of the small diameter bore portion being less than the length of the press-on region so that both stripped optical fiber portions, as well as one of the unstripped jacket portions of the light waveguides, are received in the joint region and are subjected to radical clamping forces when the sleeve is assembled onto the press-on region.

9. A connector part according to claim 1, wherein the receptacle part has at least two press-on regions, and two sleeves, one of the press-on regions being adjacent an end region and having a bore of a large diameter extending therethrough so that when a sleeve is moved onto the respective region, a press fit is obtained on the unstripped jacket portion of the other light waveguide.

10. A connector part according to claim 9, wherein the sleeve slipped onto the first mentioned press-on region having the joint region has a greater axial length than the sleeve pressed onto the second press-on region.

11. A connector device comprising at least three sleeves and a receptacle part surrounding the light waveguides, which are each provided with an unstripped jacket portion and an end with stripped optical fiber portions, the receptacle part comprising at least one cylindrical region having a small outside diameter and at least three further cylindrical regions having a large outside diameter, said cylindrical regions with the large outside diameter forming press-on regions, said part having an axially extending bore with a small diameter portion for receiving the stripped optical fiber portions and subsequent bores with large diameter portions for receiving the unstripped jacket portions of the waveguides, all of said bores lying in press-on regions to form a joint region, said sleeves having inside diameters that are slightly less than the outside diameters of the press-on regions so that when the sleeve is pressed onto the press-on region, the part applies a radial clamping force thereto, said three press-on regions receive three sleeves, with one sleeve for each of the regions, two of said regions being adjacent the ends of the part and having the large diameter bore extending therethrough so that when the two sleeves for the two end regions are slipped on, the unstripped jacket portions of the light waveguide are radially gripped by the connector device and the inner region, which receives the stripped optical fiber portions of the light waveguides, radially grips the stripped optical fiber portions by the radial clamping force of the third sleeve.

12. A connector part according to claim 11, wherein the sleeve pressed on the center press-on region having the joint region has a greater axial length than the two sleeves which are pressed on the two end press-on regions.

* * * * *